United States Patent
Li et al.

(10) Patent No.: US 8,686,076 B2
(45) Date of Patent: Apr. 1, 2014

(54) SILANE MOISTURE CURABLE HOT MELTS

(75) Inventors: Yingjie Li, Batavia, IL (US); Shuhui Qin, Bartlett, IL (US)

(73) Assignee: Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/616,069

(22) Filed: Sep. 14, 2012

(65) Prior Publication Data

US 2013/0020025 A1   Jan. 24, 2013

Related U.S. Application Data

(63) Continuation of application No. PCT/US2011/025158, filed on Feb. 17, 2011.

(60) Provisional application No. 61/314,198, filed on Mar. 16, 2010.

(51) Int. Cl.
*C08G 18/64* (2006.01)
*B05D 5/10* (2006.01)
*B32B 37/12* (2006.01)

(52) U.S. Cl.
USPC ........................ 524/188; 156/331.7

(58) Field of Classification Search
USPC ........................ 524/188; 156/331.7
See application file for complete search history.

(56) References Cited

U.S. PATENT DOCUMENTS

| | | |
|---|---|---|
| 5,767,197 A | 6/1998 | Fukatsu et al. |
| 5,908,700 A | 6/1999 | Shimizu et al. |
| 6,310,170 B1 | 10/2001 | Johnston et al. |
| 2010/0029860 A1 | 2/2010 | Honma et al. |

FOREIGN PATENT DOCUMENTS

KR  100879735  1/2009

OTHER PUBLICATIONS

International Search Report issued in connection with International Application No. PCT/US2011/025158 mailed on Nov. 30, 2011.

*Primary Examiner* — John Uselding
(74) *Attorney, Agent, or Firm* — James E. Piotrowski; Steven C. Bauman

(57) ABSTRACT

The present invention relates to moisture-curable silane-reactive hot melt compositions having an acrylate-urethane copolymer moiety. Desirably, the silane groups contain alkoxy functionality to enable and enhance moisture curing. Such compositions provide enhanced green strength without sacrificing other desirable properties.

16 Claims, No Drawings

SILANE MOISTURE CURABLE HOT MELTS

FIELD OF THE INVENTION

The present invention relates to moisture-curable silane-reactive hot melt compositions wherein moisture-curable isocyanato silane groups are incorporated onto a copolymer backbone. Desirably, the silane groups contain alkoxy functionality to enable and enhance moisture curing. Such compositions provide enhanced green strength without sacrificing other desirable properties.

BACKGROUND OF RELATED TECHNOLOGY

Silane-based moisture curable compositions are known for providing good adherence to certain substrates, e.g. glass or metal, once these compositions are fully cured. However, such compositions are liquid or pasty in their uncured state and provide little or no green strength i.e., the initial mechanical strength developed prior to when significant curing takes place.

Polyurethane reactive hot melts provide excellent green strengths but typically do not provide acceptable adhesion to substrates such as glass and metal. Many polyurethane reactive hot melts also suffer from blistering during cure.

Prior methods of enhancing initial green strength, open times and tack strength in hot melts have focused on the inclusion of various additives, such as various blends of different types and molecular weights of components used in polyurethane prepolymer formulations, or the addition of tackifiers such as thermoplastics to the thus formed polyurethane prepolymers.

While some of these prior methods have proved useful in some instances, their result for many applications have not been entirely satisfactory.

Thus, there is a need for a silane-reactive moisture-curing hot melt which overcomes the disadvantages of the prior art and exhibits improved (longer) open time, high green strength and enhanced tack strength, excellent UV and non-blistering resistance. Moreover, it would be desirable to have a silane-reactive moisture curing composition which has excellent adhesion to glass and metal and which exhibits excellent weather resistance while still maintaining acceptable mechanical, solvent resistance and other physical and chemical advantages known to hot melt compositions.

SUMMARY OF THE INVENTION

In one aspect of the invention there is provided a silane-reactive moisture curable hot melt composition which includes an acrylate-urethane copolymer moiety. Desirably, the acrylate portion has an active hydrogen group number of 0.5 to 18. These active hydrogen groups may be selected from hydroxy, mercapto and amino groups among others.

In another aspect of the invention, there is provided a moisture-curing silane-reactive hot melt composition formed by combining the components of a composition which includes:
  a.) at least one polyacrylate containing active hydrogen groups;
  b.) at least one polyol;
  c.) at least one polyisocyanate; and
  d.) at least one moisture-curable end-capping isocyanato silane.

The moisture-curable silane may be an end-capping (or terminal) group, or may also be present as pendent groups along the copolymer chain.

In one aspect of the invention, there is provided a process for making a silane-reactive hot melt composition which includes:
  (i) forming an acrylate-urethane copolymer by reacting a composition which includes:
    a.) at least one polyacrylate containing active hydrogen groups;
    b.) at least one polyol;
    c.) at least one polyisocyanate, wherein the molar ration of (a+b)/c is >1.0; and
  (ii) reacting the reaction product of (i) with a moisture curable isocyanato silane.

Desirably, the process includes the step of waiting until the concentration of free isocyanate is essentially zero before adding the moisture-curable reactive silane.

DETAILED DESCRIPTION OF THE INVENTION

For purposes of the present invention the following definitions apply:

"(Meth)acrylate" includes methylacrylate and acrylate.

"Green strength" is the mechanical strength developed as a result of solidification prior to substantial moisture curing.

"Full cure" means substantial moisture curing has occurred.

The present invention provides silane-reactive moisture-curable hot melt adhesives which have long open time, high initial green strength and high tack strength as compared to known moisture-curable hot melt compositions. The present inventive silane-reactive moisture-curable hot melt adhesives also are non-blistering, and have excellent UV resistance, excellent adhesion to glass and metal, as well as excellent weather resistance.

The compositions of the present invention form moisture-curing silane-reactive hot melt compositions which enable cross-linking. The moisture-curing silane-reactive hot melts may be formed by reacting at least one polyacrylate containing active hydrogen groups, with one or more appropriate polyols, at least one polyisocyanate and at least one moisture-curing isocyanato silane. Desirably, the isocyanato silane has at least two, alkoxy groups, e.g. two or three methoxy, ethoxy or propoxy groups. Combinations of these alkoxy groups may also be used on the same silane. A particularly desirable silane is isocyanatotrimethoxy silane.

The active hydrogen groups on the polyacrylate portion desirably have a hydroxyl number of 0.5 to 18.

The silane-reactive acrylate-urethane copolymer hot melts are desirably formed by reacting an excess amount of polyols and acrylic resin with at least one polyisocyanate until the concentration of free isocyanate group is essentially zero. Desirably, the isocyanate is an alphatic isocyanate. At least some of the active hydrogen groups in the polyacrylate (acrylic resin) may be terminated by reacting with an isocyanatosilane. The isocyanatosilane may contain one or more moisture-curing groups in order to moisture cure.

Once the silane-reactive moisture curing hot melt compositions are formed, they may be combined with various additives such as moisture-curable catalysts, adhesion promoters, reactive diluents, pigments, fillers, rheology modifiers, conductive agents, stabilizers, moisture scavengers, antioxidants, UV barriers, waxes, plasticizers, tackifers, oligomeric polymer resins, thermoplastic polymer resins, moisture curable resins, and combinations thereof.

Useful components for preparing the silane-reactive acrylate-urethane copolymers include a variety of polymers, polyisocyanates, acrylates and moisture-curing isocyanato silanes.

Among the acrylates useful in preparing the inventive copolymers include a polymer made from one or more of the following: $C_1$ to $C_{18}$-alkylesters of acrylic acid, $C_1$ to $C_{18}$ alkylesters of methacrylic acid, acrylic acid, methacrylic acid, hydroxyethylacrylate, hydroxyethylmethacrylate (HEMA), hydroxypropylacrylate, hydroxypropylmethacrylate, hydroxybutylacrylate, hydroxybutylmethacrylate, esters of (meth)acrylic acid and glycol oligomers and polymers such as di-, tri-, tetra- and/or polyethyleneglycol, esters of (meth)acrylic acid and glycol ethers such as methoxyethanol and/or ethoxyethanol, vinylesters like vinylacetate, vinylpropionate, vinyl esters of highly branched monocarboxylic acids (such as the vinyl ester of the Versatic acid sold by Shell Chemicals), vinylethers, fumarates, maleates, styrene, alkylstyrenes, butadiene as well as acrylonitrile. In one aspect of the invention, the acrylic polymer is essentially free of repeating units obtained from unfunctionalized monomers such as olefins (e.g., ethylene). Instead of or in addition to the hydroxyfunctional (meth)acrylates, the corresponding aminofunctional monomers may be used.

The choice of the particular monomer or monomer mixture is largely dependant upon the desired end use of the adhesives including the suitability for the application equipment to be used. As mentioned earlier the acrylate polymers of the present invention have active hydrogen groups preferably in the form of OH-groups, amino groups, or mercapto groups.

The amount of active hydrogen groups is determined by their OH-number as specified in DIN 53783. The OH-number of the acrylate polymers should be in the range between 0.5 and 18, preferably between 1 and 10, the most preferred range being 1 to 6 mg KOH/g. It has been discovered that adhesives prepared using acrylate polymers having a relatively low hydroxyl number (e.g., 1 to 6 mg KOH/g) exhibit better stability and a less rapid rate of viscosity increase than adhesives prepared using analogous polymers having a higher hydroxyl number. This means that the working time for an adhesive being applied by a means requiring exposure to atmospheric moisture may be effectively extended. In terms of weight average hydroxyl functionality, it is desirable that this value be between about 0.9 and about 10. Particularly preferred is a low molecular weight polymer having a weight average hydroxyl functionality between about 1.2 and about 6. The weight average hydroxyl functionality is equal to the weight average molecular weight of the polymer times the weight fraction of hydroxy functional monomer (like, hydroxyethylmethacrylate, for example) divided by the number average (Mn) molecular weight of the hydroxy functional monomer.

The acrylate polymers having active hydrogen groups are thermoplastic polymers and may be produced by known procedures, i.e. they may be made by ionic, thermal and preferably by a free radical polymerization.

The active hydrogen groups may also be incorporated into the polymer by using a free radical starter having active hydrogen groups and/or by using a chain transfer agent bearing active hydrogen groups. Adding small amounts of comonomers bearing active hydrogen groups such as the above mentioned hydroxyfunctional (meth)acrylate monomers to the monomer mix is another viable alternative. Whereas the first two methods generate predominantly terminal functional groups, the third method generates functional groups statistically distributed along the polymer chains. Further details for all three methods can be found for example in EP-A-205846 and the references cited there. Since these polymers are produced via free radical polymerization, the functional groups will be randomly distributed on the individual polymer chains.

This implies that, especially with very low OH-numbers, a certain number of polymer molecules may not bear any functional group whereas others may bear two or more functional groups.

The acrylate polymers with an active hydrogen group may be made according to any known aqueous or anhydrous polymerization process. They may also be polymerized in one or more of the polyether polyol(s) and/or polyester polyol(s).

Desirably, the average molecular weight range for the acrylate polymers used to form the inventive copolymers is about 3,000 to about 80,0000, more desirably about 6,000 to about 40,000 even more desirably about 7,000 to about 30,000. The average molecular weight is determined by standard gel permeation chromatography (GPC) sometimes also called size exclusion chromatography (SEC). It is the number average molecular weight (Mn) as calibrated against an external polystyrene-standard of certified molecular weight.

The amount of polyacrylate used in the foundation of the inventive copolymer may be about 5% to that 50% by weight, desirably about 10% to about 40% and more desirably about 15% to about 30% by weight of the total composition.

Addition of the reactive moisture-curing silane group for the copolymers is desirably carried out subsequent to copolymer formation.

Polyols

Hydroxyfunctional compounds (i.e., "polyols") for making the polyurethane prepolymer may be selected from polyetherpolyols, polyester polyols, polybutadiene polyol, and/or aromatic polyols and combinations thereof.

A "polyether polyol" is understood to be a linear polyether containing predominantly two OH groups. The preferred polyether polyols are diols corresponding to the general formula HO(—R—O)$_m$—H, where R is a hydrocarbon radical containing 2 to 4 carbon atoms and m is in the range from 4 to 225 on average. Specific examples of such polyether polyols include polyethylene glycol, polybutylene glycol, polytetramethylene glycol (polyTHF) and, polypropylene glycol (R is $CH_2CH(CH_3)$—). Such polyether polyols may be prepared by known methods such as, for example, polymerization of one or more cyclic ether monomers such as ethylene oxide, propylene oxide, n-butene oxide, and tetrahydrofuran. The polyether polyols may be used both as homopolymers and as copolymers, both as block copolymers and as statistical (random) copolymers. Only one type of polyether polyol is preferably used, although mixtures of 2 to 3 polyether polyols differing in their average molecular weight and/or in the nature of their structural elements may also be used. Small quantities of a trifunctional polyether polyol (i.e., a polyether triol) may also be present in the mixture. Desirably, the number average molecular weight of the polyether polyols may be less than 4,000, more desirably 2,000 or less and even more desirably 1,000 or less.

A "polyester polyol" is understood to be a polyester having more than 1 OH group, preferably 2 terminal OH groups. Preparation is by known routes, either from a) aliphatic hydroxycarboxylic acids, or from b) aliphatic and/or aromatic dicarboxylic acids having from 6 to 12 C atoms and particularly even-numbered diols having from 4 to 8 C atoms.

Other appropriate derivatives may be used, e.g., lactones, methyl esters or anhydrides. Specific starting materials include: 1,4-butanediol, 1,6-hexanediol, 1,10-decanediol, 1,12-dodecanediol, adipic, azelaic and sebacic acids, 1,10-decanedicarboxylic acid and lactones. The acid component may include up to 25% on a molar basis of other acids, for example, cyclohexanedicarboxylic acid, terephthalic acid and isophthalic acid. The glycol component may include up to 15% on a molar basis of other diols, for example, diethylene glycol and 1,4-cyclohexanedimethanol. In addition to homopolymers from the above components, above all, copolyesters from the following components or derivatives thereof are of importance: 1. adipic acid, isophthalic acid, phthalic acid, and butanediol; 2. adipic acid, phthalic acid and hexanediol; 3. adipic acid, isophthalic acid, phthalic acid, ethylene glycol, neopentylglycol, and 3-hydroxy-2,2-dimethylpropyl-3-hydroxy-2,2-dimethyl propanoate; 4. adipic acid, phthalic acid, neopentylglycol, and ethylene glycol; and 5. adipic acid and hexanediol.

The copolyester from adipic acid, isophthalic acid, phthalic acid, and butanediol is partially crystalline and has a high viscosity. Hence, it results in high initial strength. The copolyester from adipic acid, phthalic acid and hexanediol has low glass transition temperature and therefore, results in improved low-temperature flexibility.

The suitable polyester polyols may optionally be lightly branched, i.e. small quantities of a tricarboxylic acid or trihydric alcohol have been used in their production.

The amount of polyether polyol used in the formulation of the inventive compositions may vary, for example, amounts of about 10% to about 70% by weight and generally in amounts of about 20% to about 60% by weight of the total compositions. In the case of polyester polyols, they may be present in amounts of about 0% to about 50% by weight of the total composition. Combinations of any of the aforementioned polyols may be used to tailor the properties of the final copolymer. Excess polyol in relation to polyisocyanate is used to ensure that all NCO groups are reacted to permit further reaction with the isocyanatosilane.

It has been shown that bonding strengths of the inventive compositions generally increase as the molecular weight of the polyether polyol used in their formation decreases. Table I shows examples of this particularly on glass substrates.

Polyisocyanates

Polyisocyanates useful in preparing the inventive copolymer compositions include aromatic, aliphatic and cycloaliphatic isocyanates.

Examples of suitable aromatic polyisocyanates include: any isomers of toluene diisocyanate (TDI) either in the form of pure isomers or in the form of a mixture of several isomers, naphthalene-1,5-diisocyanate (NDI), naphthalene-1,4-diisocyanate (NDI), 4,4'-diphenylmethane-diisocyanate (MDI), 2,4'-diphenylmethane-diisocyanate (MDI), xylylenediisocyanate (XDI), 2,2-diphenylpropane-4,4'-diisocyanate, p-phenylene diisocyanate, in-phenylene diisocyanate, diphenyl-4,4'-diisocyanate, diphenylsulphone-4,4'-diisocyanate, 1-chlorobenzene-2,4-diisocyanate, 4,4',4''-triisocyanato-triphenyl-methane, 1,3,5-triisocyanato-benzene, 2,4,6-triisocyanato-toluene and furfurylidene diisocyanate. Examples of suitable cycloaliphatic polyisocyanates include 4,4'-dicyclohexylmethane diisocyanate (H.sub.12 MDI), 3,5,5-trimethyl-3-isocyanatomethyl-1-isocyanato-cyclohexane (isophorone-diisocyanate, IPDI), cyclohexane-1,4-diisocyanate, cyclohexane-1,2-diisocyanate, hydrogenated xylylene diisocyanate (H.sub.6 XDI), m- or p-tetramethylxylylene diisocyanate (m-TMXDI, p-TMXDI) and diisocyanate from dimer acid. Examples of aliphatic isocyanates include hexane-1,6-diisocyanate (HDI), 2,2,4-trimethylhexane-1,6-diisocyanate, 2,4,4-trimethylhexane-1,6-diisocyanate, butane-1,4-diisocyanate and 1,12-dodecane diisocyanate ($C_{12}$. DI).

Under certain conditions it may be advantageous to use mixtures of the above mentioned polyisocyanates.

The polyisocyanates may be used in amounts of about 5% to about 40% by weight of the total composition and desirably about 7% to about 30% by weight of the total composition.

Reactive Silanes

Reactive moisture-curable silanes useful in forming the inventive copolymer compositions include those which have alkoxy functionality. As mentioned above, the incorporation of these reactive groups, as terminal and/or pendent groups provide moisture-curing capability and as compared to the same or similar copolymer combinations but without these reactive silane groups, as well as comparatively better final bond strength as shown in the examples included herein.

Isocyantoalkylsilanes are among those useful. For example, isocyanatoethyltrimethoxysilane and isocyanatopropyltrimethoxysilane are among those useful. One particularly useful reactive silane is isocyanatotrimethoxysilane. The reactive silanes are desirably used to end-cap the acrylate-urethane copolymer. The reactive silanes desirably include one to three (1-3) alkoxy groups, and selected from $C_{1-4}$ alkoxy, e.g. methoxy, ethoxy, propoxy, butoxy and combinations thereof.

The reactive silanes may be included in the compositions used to prepare the inventive moisture curing polymers in amounts of about 0.5% to about 10% by weight, desirably about 1% to about 7% by weight and more desirably 2% to about 6% by weight of the total composition.

Additional Additives

Various additives may be incorporated into the inventive compositions including, but not limited to, catalysts, stabilizers, tackifers, fillers, pigments, plasticizers, adhesion promoters, flame retardants, conductive agents, rheology modifiers, moisture scavengers, antioxidants, UV barriers, waxes, oligomeric polymer resins, thermoplastic polymer resins, moisture curable resins, and combinations thereof.

The optional catalysts may accelerate the formation of the copolymer during its production and/or the moisture curing/crosslinking process after application of the hot melt adhesive. Suitable catalysts include conventional moisture cure catalysts such as, for example, compounds of divalent and tetravalent tin, more particularly the dicarboxylates of divalent tin and the dialkyl tin dicarboxylates and dialkoxylates. Examples of such catalysts are dibutyl tin dilaurate (DBTDL), dibutyl tin diacetate, dioctyl tin diacetate, dibutyl tin maleate, tin(II) octoate, tin(II) phenolate or even the acetyl acetonates of divalent and tetravalent tin. The highly effective tertiary amines or amidines may also be used as catalysts, optionally in combination with the tin compounds mentioned above. Suitable amines are both acyclic and, in particular, cyclic compounds. Examples include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether or dimethyl piperazine or even mixtures of the amines mentioned above.

"Stabilizers" in the context of the present invention include stabilizers that stabilize the viscosity of the silane-reactive moisture curable hot melt during its production, storage and application. Suitable stabilizers of this type include, for example, monofunctional carboxylic acid chlorides, monofunctional highly reactive isocyanates and non-corrosive inorganic acids. Examples of such stabilizers are benzoyl chloride, toluene sulfonyl isocyanate, phosphoric acid or phosphorous acid. In addition, stabilizers in the context of the present invention include antioxidants, UV stabilizers or hydrolysis stabilizers. The choice of these stabilizers is determined in part by the main components of the hot melt adhesive, as well as application conditions and by the loads to which the bond is likely to be exposed. When the hot melt is predominantly made up of polyether units, antioxidants—optionally in combination with UV stabilizers—may be incorporated. Examples of suitable antioxidants include the commercially available sterically hindered phenols and/or thioethers and/or substituted benzotriazoles. In cases where key components of the acrylate-urethane copolymer consist of polyester units, hydrolysis stabilizers, for example of the carbodiimide type, are preferably used.

Examples of suitable tackifying resins include abietic acid, abietic acid esters, terpene resins, terpene/phenol resins or hydrocarbon resins. Examples for fillers include silicates, talcum, calcium carbonates, clays or carbon black. Suitable rheology improvers imparting thixotropy or sag resistance are for example BENTONE (a rheological additive available from Rheox), pyrogenic (fumed) silicas, urea derivatives and fibrillated or pulp chopped fibers.

Although frequently no additional adhesion promoters are required, sometimes adhesion promoters may be blended in. In special cases organofunctional silanes like amino silanes, mercapto silanes, the epoxy functional 3-glycidyl-oxypropyl-trialkoxysilane, the isocyanate functional silanes, such as isocyanatoalkoxysilanes, and in particular, isocyanatotrimethoxysilane, isocyanatoethyltrimethoxysilane and isocyanatopropyltrimethoxysilane, epoxy resins, melamine resins or phenolic resins may be added as adhesion promoters.

Copolymer Preparation

The inventive copolymers of the present invention were formed by selecting the components set forth in Table I and following the steps of mixing the acrylate resin (Elvacite® 2978, from Lucite) with the polyols (polyether and/or polyester polyols) with heat and agitation. Excess amounts of polyol were added relative to the polyisocyanate reactant to ensure that all NCO groups were consumed and to permit further reaction with the isocyanatosilane. This mixture was then dehydrated under vacuum at 110° C.-130° C. for about 1 hour. The polyisocyanate (IPDI) and the catalyst (DBTDL) were added and the reaction was allowed to proceed until the concentration of free isocyanate groups (NCO %) was essentially zero. Once this was determined, the reactive silane (isocyanatotrimethoxysilane) was added to terminate the active hydrogen and endcap the thus formed acrylate-urethane copolymer moiety. The reaction is stopped when the desired NCO % is obtained. Subsequent to the copolymer formation, one or more additional reactive silanes, which may be the same or a different reactive silane as used to endcap, may be optionally be blended in. A catalyst, e.g. DMDEE (see Table I), may also be blended in at this stage.

The following non-limiting examples are illustrative of the invention.

Examples

Table I shows Inventive Compositions A-E with varying amounts of different polyols and polyisocyanates, and the resultant bond strengths.

Also shown are Comparative Compositions F and G. Comparative composition F is made using substantially the same reactants for forming the copolymer moiety as the inventive compositions, but without the inclusion of moisture-curable silane groups. In Composition F, the reactive silane (isocyanatotrimethoxysilane) was not incorporated into the copolymer per se, but added as an adhesion promoter to the already formed copolymer. Comparative Composition H is a commercial composition from Henkel Corporation sold under the brand name Henkel Purmelt® R-513C. This composition is made in accordance with U.S. Pat. No. 6,465,104 and contains reactive acrylic groups, PPG polyol, crystalline polyester polyol and MDI. The ability for Composition F and G to cure is based on its unreacted isocyanate groups.

All the compositions in Table I were prepared by first mixing the polyols and acrylic resin using heat and agitation. The mixture was dehydrated under vacuum at about 110° C. to about 130° C. for about 60 minutes. The polyisocyanate and catalysts (DBTDL) were then added and further reacted to form the acrylate-urethane copolymer backbone. All compositions, except Composition F and G, were reacted until all free (unreacted) isocyanate groups were fully reacted, i.e., the concentration of free isocyanate groups is essentially zero. For Composition F and G, however, free isocyanate groups remained for moisture-curing purposes.

TABLE I

Compositions (% Weight)

| Component | A | B | C | D | E | F | G | H (Henkel Purmelt® R-513C) |
|---|---|---|---|---|---|---|---|---|
| PPG 1000[1] | 39.8 | 21.1 | | | | 39.5 | 41.8 | |
| PPG 2000[2] | | 21.1 | 44 | 22.7 | | | | |
| PPG 4000[3] | | | | 22.7 | 46.3 | | | |
| Dynacoll 7360[4] | 20 | 20 | 20 | 20 | 20 | 20 | 20 | |
| Elvacite 2978[5] | 25 | 25 | 25 | 25 | 25 | 25 | 25 | |
| IPDI[6] | 10.04 | 7.64 | 5.84 | 4.44 | 4.04 | 12.84 | 13.04 | |
| MDI[7] | | | | | | | | |
| DBTDL[8] | 0.06 | 0.06 | 0.06 | 0.06 | 0.06 | 0.06 | 0.06 | |
| Silquest A-35[9] | 2.5 | 2.5 | 2.5 | 2.5 | 2 | | | |
| Silquest A-35[10] | 2.5 | 2.5 | 2.5 | 2.5 | 2.5 | 2.5 | | |
| DMDEE[11] | 0.1 | 0.1 | 0.1 | 0.1 | 0.1 | 0.1 | 0.1 | |
| Viscosity (cps) at 250 F. | 33000 | 17500 | 22000 | 25000 | 18000 | 7950 | 12000 | 12000 |
| RT after bond strength moisture cured | Excellent | Excellent | Good | Fair | Poor | Good | Poor | Poor |

[1] polypropylene glycol (polyether) polyol, ave. mw 1,000, Voranol 220-110N available from Dow
[2] polypropylene glycol (polyether) polyol, ave. mw 2,000, Voranol 220-056N available from Dow
[3] polypropylene glycol (polyether) polyol, ave. mw 4,000, Voranol 220-028N available from Dow
[4] polyester polyol, available from Evonik, a crystalling copolyester based on adipic acid and hexanediol with a molecular weight of about 3,500 and a m.p. of about 55° C.
[5] acrylic resin, available from Lucite, Tg 75° C., OH#2
[6] isophorene diphenyl diisocyanate, available from Bayer
[7] 4,4' methylene diphenyl diisocyanate, available from Bayer
[8] moisture-cure: catalyst, dibutyltin dilaurate, available from Mooney Chemicals, Inc.
[9] gamma-isocyanatotrimethoxysilane: added as a reactact to form the copolymer, available from Momentive
[10] gamma-isocyanatotrimethoxysilane: added as adhesive promoter subsequent to copolymer formation, available from Momentive
[11] 2,2 dimorpholinodiethylether—catalyst, available from Huntsman Corp.

Each of the compositions in Table I was tested for bond strength. A sample of each composition was melted at a temperature of about 250° and extruded onto a flat glass or metal substrate and spread out by light pressing. The substrate was stored at room temperature and 40% relative humidity (RH) for at least three days prior to testing for bond strength.

Bond strength is rated as "poor" if the bonded part can be easily separated from the substrate, "fair" if the bonded part can be separated but with some resistance, "good" if the bonded part can be separated with partial cohesive failure, "excellent" if the bonded part can only be separated with complete cohesive failure.

As can be seen from the Table, inventive compositions which incorporate a moisture-curable silane into the copolymer and which used polyols of 2000 molecular weight or lower (A, B, C) demonstrated excellent to good bond strengths in glass as compared to those compositions which use higher molecular weight polyols (D, E), which gave surprisingly fair to poor results on glass.

Composition F shows that when moisture-curable silane groups are added to the already formed copolymer, good adhesion results to glass. However, when no moisture-curing groups silane are present either on the copolymer or subsequently added after copolymer formation, the composition gives poor adhesion results to glass, even though a polyol of molecular weight of 2000 or less (PPG 1000) was used to make the copolymer.

These results clearly indicate that the moisture-curing silane-reactive hot melt-containing acrylate copolymer moieties provide better bonding results than substantially the same copolymer which does not incorporate curable silane groups. The inventive compositions also provide better adhesion to glass substrates, and particularly substrates requiring the joining of glass and metal, as compared to similar formulations, which incorporate the moisture curable silane as an additive rather than as part of the copolymer.

The invention claimed is:

1. A hot melt composition having terminal moisture-curable silane groups formed by combining the components of a composition comprising:
   a.) at least one polyacrylate containing active hydrogen groups randomly distributed along the polyacrylate chain;
   b.) at least one polyol;
   c.) at least one polyisocyanate;
   d.) at least one moisture-curable end-capping isocyanato silane.

2. The composition of claim 1, wherein the active hydrogen groups on said polyacrylate are present as hydroxyl groups having a hydroxyl number of 0.5 to 18.

3. The composition of claim 1, wherein the at least one moisture-curable endcapping isocyanatosilane includes alkoxy groups.

4. The composition of claim 1, wherein the at least one polyacrylate has a number average molecular weight of about 3,000 to about 80,000 and a Tg of about 15° to about 85° C.

5. The composition of claim 1, wherein the at least one polyol is a polyether polyols, polyester polyol or combination thereof.

6. The composition of claim 1, wherein the at least one polyol comprises a polyether polyol having a number average molecular weight less than 4,000.

7. The composition of claim 1, wherein the at least one polyol comprises a polyether polyol that is present in amounts of about 10% to 70% by weight of the total composition.

8. The composition of claim 1, wherein the at least one polyacrylate is present in amounts of about 5% to about 50% by weight of the total composition.

9. The composition of claim 1, further including at least one additional moisture curable silane blended therewith.

10. A process for making moisture curing silane-reactive hot melt composition comprising:
   (i) forming an acrylate-urethane copolymer by reacting a composition comprising:
      a.) at least one polyacrylate containing active hydrogen groups randomly distributed along the polyacrylate chain;
      b.) at least one polyol;
      c.) at least one polyisocyanate wherein the molar ratio of (a+b)/c is >1.0;
   (ii) reacting the reaction product of (i) with a moisture curable isocyanotosilane.

11. The process of claim 10, further including the step of waiting until the concentration of free isocyanate is essentially zero before adding the isocyanatosilane.

12. The composition of claim 10, wherein the active hydrogen groups on said at least one polyacrylate are present as hydroxyl groups having a hydroxyl number of 0.5 to 18.

13. The process of claim 10, further comprising adding at least one additive selected from the group consisting of moisture cure catalysts, adhesion promoters, tackifiers, plasticizers, fillers, pigments, stabilizers, flame retardants, conductive agents, rheology modifiers, moisture scavengers, antioxidants, UV barriers, waxes, oligomeric polymer resins, thermoplastic polymer resins, moisture curable resins, and combinations thereof.

14. A method of forming a coating on a substrate comprising applying the composition of claim 1 to a substrate and permitting it to cure.

15. An article comprising cured reaction products of the moisture-curing silane-reactive functionalized hot melt composition of claim 1.

16. The composition of claim 1, wherein the terminal moisture-curable silane group comprises an alkoxy moiety.

* * * * *

UNITED STATES PATENT AND TRADEMARK OFFICE
CERTIFICATE OF CORRECTION

PATENT NO. : 8,686,076 B2  Page 1 of 1
APPLICATION NO. : 13/616069
DATED : April 1, 2014
INVENTOR(S) : Yingjie Li and Shuhui Qin It is certified that error appears in the above-identified patent and that said Letters Patent is hereby corrected as shown below:

In the specification
Column 2, line 9: Change "ration" to -- ratio --.
Column 5, line 47: Change "in-phenylene diisocyanate," to -- m-phenylene diisocyanate, --.
In the claims
Column 9, line 45: After "polyisocyanate;", insert -- and --.
Column 10, line 28: After ">1.0;", insert -- and --.

Signed and Sealed this
Fifth Day of April, 2016

Michelle K. Lee
*Director of the United States Patent and Trademark Office*